United States Patent [19]

Toyama et al.

[11] 3,931,394

[45] Jan. 6, 1976

[54] HYDROGEN SULFIDE REMOVAL

[75] Inventors: Akira Toyama, Kobe; Koji Ishizaki, Akashi, both of Japan

[73] Assignee: Kobe Steel Ltd., Japan

[22] Filed: May 5, 1971

[21] Appl. No.: 140,585

Related U.S. Application Data

[63] Continuation of Ser. No. 792,837, Jan. 21, 1969, abandoned.

[52] U.S. Cl.................................. 423/573; 23/225
[51] Int. Cl............................................. C01b 17/04
[58] Field of Search....................... 23/225; 423/573

[56] References Cited
UNITED STATES PATENTS

| | | | |
|---|---|---|---|
| 1,700,982 | 2/1929 | Hill et al.......................... | 23/225 P |
| 3,099,535 | 7/1963 | Maezawa et al................. | 23/225 P |

*Primary Examiner*—G. O. Peters

[57] ABSTRACT

A process for removal and conversion into sulfur of hydrogen sulfide in a gaseous or liquid material which comprises essentially treating the said material with a nitrohumic acid or its salt prepared by treating humic acid with a nitrating agent and, if necessary, converting the resultant into an alkaline salt. The process is advantageous essentially in that hydrogen sulfide can be removed economically and converted into sulfur, and that the desulfurization agent, i.e. a nitrohumic acid or its salt is non-toxic and non-corrosive.

5 Claims, No Drawings

HYDROGEN SULFIDE REMOVAL

CROSS REFERENCE

This is a continuation of Ser. No. 792,837, filed Jan. 21, 1969, now abandoned.

This invention relates to a process for the removal of hydrogen sulfide. More particularly, it relates to a process for the removal and conversion into sulfur of hydrogen sulfide in a gaseous or liquid material.

Hitherto, there have been known various methods for the removal of hydrogen sulfide, e.g. the Seaboard process, the Girbotol process, the Perox process, the Giammarco-Vetrocoke process, the Thyrox process, etc. However, they have such one or more drawbacks as: (1) the removed hydrogen sulfide is released without receiving any chemical change in the regeneration process of the absorptive solution and causes pollution of the air; (2) the desulfurization agent employed is too expensive to perform the removal of hydrogen sulfide economically; (3) the condition for the removal process is limited (e.g. the absorptive solution has to be cooled in summer season); (4) a strict sanitary administration is required in the factory because of toxicity of the desulfurization agent such as arsenic compounds; and/or (5) the desulfurization agent employed is much corrosive against the plant steel.

In the course of studies of hydrogen sulfide removal, it has been discovered that nitrohumic acid and its salts have unexpectedly excellent desulfurization ability and can be utilized for the purpose of the industrial desulfurizations. The present invention has been accomplished essentially on the basis of this discovery. Accordingly, a fundamental object of the present invention is to embody a process for the removal of hydrogen sulfide in a gaseous or liquid material. Another object of the invention is to embody a process for the conversion of hydrogen sulfide into sulfur. A further object of the invention is to be embody a process for removing hydrogen sulfide from a gaseous or liquid material and recovering the hydrogen sulfide as sulfur. These and other objects of the invention will become apparent to those conversant with the art to which the present invention concerns from the following detailed explanation of the invention and the working examples.

According to the present invention, hydrogen sulfide is removed from gaseous or liquid materials containing it by treatment with nitrohumic acid or its salts. When the materials containing hydrogen sulfide is brought into contact with the nitrohumic acid or its salt, hydrogen sulfide is converted into sulfur which can be easily separated from the gaseous or liquid materials. Although the nitrohumic acid is simultaneously reduced and inactivated, it can be completely regenerated by treatment with an oxidizing agent such as air or oxygen. Accordingly, when the contact of the nitrohumic acid or its salt with hydrogen sulfide is carried out in the presence of such an oxidizing agent as air or oxygen, the removal and conversion into sulfur of hydrogen sulfide can be performed continuously.

In the sense of the present invention, the nitrohumic acid as a desulfurization agent is a nitration product of humic acid (an amorphous acidic organic substance, being brown to black, insoluble in an acid, but soluble in an alkali, and contained in certain kinds of soil or coal of a low coalification rank). Whether purified or not, the nitration product of humic acid can be used as the desulfurization agent in the present invention. The nitrohumic acid is usually not a single compound, but a mixture of amorphous macromolecular compounds, the chemical structures of which have never been suffifiently elucidated. However, it has been confirmed that the nitrohumic acid contains no esteric nitro group. This means that the nitro groups of the nitrohumic acid are stable and assumed to be introduced to aromatic ring systems as substituents. Moreover, the nitrohumic acid as the desulfurization agent can be used in the form of an alkali salt such as sodium salt, potassium salt, ammonium salt and the like.

The nitrohumic acid can be prepared by treating humic acid with a conventional nitrating agent such as concentrated nitric acid, fuming nitric acid, a mixed acid (e.g. nitric acid and phosphoric acid, nitric acid and acetic acid, nitric acid and sulfuric acid), a nitrogen oxide (e.g. dinitrogen pentoxide, nitrogen dioxide), and the like. Any purification of the product is not essential for the purpose of the present invention. But, if desired, the nitration product may be purified by a conventional purification procedure. More practically, the nitrohumic acid as the desulfurization agent can be prepared by treating a humic acid-containing substance, i.e. a coal dust of a low coalification rank, such as lignite dust, brown coal dust or a mixture thereof with the above illustrated nitrating agent in water or such an organic solvent being inert at the condition for the production of the nitrohumic acid as methanol, ethanol, chloroform, carbon tetrachloride, acetic acid and the like. Although the thus obtained nitration product can be used for the hydrogen sulfide removal, it may be converted into its alkali salt as exemplified above, if so desired.

With the thus prepared nitrohumic acid or its salt, hydrogen sulfide contained in a gasous or liquid material can be completely removed and converted into sulfur. Examples of the gaseous or liquid material to be purified by the process of the present invention are coal gas, coke oven gas, synthesis gas, natural gas, air, liquid hydrocarbon and the like.

Practical procedures of the present invention are carried out in a variety of manners in accordance with the properties and states of the material to be purified and the quantities of hydrogen sulfide contained therein. But, the essential step is to bring the material in contact with the nitrohumic acid or its salt. For instance, when a liquid material is to be purified, an aqueous solution of the nitrohumic acid or its salt is added to the material and the mixture is stirred or shaken until the conversion of hydrogen sulfide into sulfur is completed. On the contrary, a gaseous material may be passed through an aqueous solution of the nitrohumic acid or its salt. Alternatively, a gaseous material may be introduced into a packed column of the nitrohumic acid or its salt being adsorbed to a suitable carrier.

When the nitrohumic acid or its salt is used in the form of an aqueous solution, it is preferred to adjust the pH within a range from 8.0 to 10.0. For this purpose, such a base as potassium hydroxide, sodium hydroxide, potassium carbonate, sodium carbonate, ammonia and the like may be added to the aqueous solution.

The contact may be achieved under any conditions of temperature and pressure, because the activity of the nitrohumic acid or its salt is not substantially affected by such conditions. But, from the econimical viewpoints, it is desirable to execute the contact at a temperature from 0°C to 100°C, preferably around the normal temperature, i.e. 20°C to 30°C.

By the contact, hydrogen sulfide is oxidized and converted into sulfur, and the nitrohumic acid or its salt is simultaneously reduced and inactivated. But, it can be easily and completely regenerated by treatment with an oxidizing agent such as air or oxygen. Therefore, when the contact is carried out in the presence of air or oxygen, the removal of hydrogen sulfide can be effected continuously.

As it will be apparent from the above illustration, the process of the present invention is also useful for recovering sulfur from hydrogen sulfide or a hydrogen sulfide-containing material.

For the removal of hydrogen sulfide from gaseous materials and recovery of sulfur, it is advantageous to adopt a so-called wet-adsorption procedure. For this purpose, there can be employed per se conventional equipments such as spray towers, deflector washers, mechanical scrubbers, atomizing scrubbers, wet filters and packed towers. It is most advantageous to bring the gaseous material in contact with an alkaline solution of the nitrohumic acid or its salt in a contacting section and then to transfer the solution to a regeneration section where the solution is treated with an oxidizing agent such as air to regenerate the nitrohumic acid or its salt as well as to complete the precipitation of sulfur. The regenerated solution can be returned to the contacting section after the removal of the precipitated sulfur.

The process of the present invention overcomes all the difficulties encountered in the hitherto known processes, and is characterized by the advantages in the following points: (1) since hydrogen sulfide is converted into sulfur, no pollution of the air is caused; (2) since the nitrohumic acid and its salts are quite harmless to the human beings, no strict sanitary administration in the factory is requisite; (3) the nitrohumic acid and its salts are quite non-corrosive against the plant steel; (4) the waste nitrohumic acid and its salts are easily regenerated; (5) the nitrohumic acid and its salts are adequately inactive against the materials to be purified (e.g. carbon dioxide, organosulfur compounds, hydrogen cyanide); (6) the nitrohumic acid and its salts are highly economical, because they are prepared with ease from inexpensive materials (e.g. lignite dust, brown coal dust); and (7) the nitrohumic acid and its salts are so stable as to be used quite safely even at a high temperature and a high pressure.

The following example will illustrate the present invention in further details. It should be understood that it is presented for the purpose of illustration only, but not of limitation. The abbreviations used have conventional significances.

EXAMPLE

An absorption column is prepared by packing glass Raschig rings (external diameter 6 mm, internal diameter 4 mm, length 6 mm) in a glass tube (internal diameter 50 mm) to a height of 70 cm. An alkaline solution (25°C) of nitrohumic acid is passed from the top downwards through the column at a flow velocity of 25 L/hr and a coke oven gas containing 4.8 g/NM$^3$ of hydrogen sulfide from the bottom upwards through the column at a flow velocity of 260 L/hr. The outflow of the nitrohumic acid solution is collected in a 13 L-glass vessel, and air is blowed into the solution to complete the precipitation of sulfur. When 1 NM$^3$ of the coke oven gas is passed through the column, the precipitated sulfur is collected and weighed. The results are shown in the following Table. No hydrogen sulfide is detected from the outflow of the gas.

Table

| Nitro-humic Acid No. | Concentration* (w/v %) | Base** | pH*** | Recovered Pure Sulfur (g) | Recovery Ratio (%) |
|---|---|---|---|---|---|
| 1 | 0.3 | Sodium carbonate | 9.0 ± 0.1 | 3.9 | 86 |
| 2 | 0.3 | Sodium carbonate | 9.0 ± 0.1 | 3.8 | 84 |
| 3 | 0.2 | Ammonia | 9.0 ± 0.1 | 4.4 | 97 |
| 4 | 0.2 | Sodium carbonate | 9.0 ± 0.1 | 4.3 | 95 |
| 5 | 0.4 | Ammonia | 9.0 ± 0.1 | 4.3 | 95 |

Note:
*Concentration of the nitrohumic acid.
**Base for the pH adjustment.
***pH of the nitrohumic acid solution. Nitrohumic acid No. 1: prepared by adding concentrated nitric acid gradually to a suspension of brown coal dust in ethanol and then refluxing the mixture; nitrohumic acid No. 2: prepared by adding concentrated nitric acid gradually to a suspension of brown coal dust in methanol and then refluxing the mixture; nitrohumic acid No. 3: prepared by adding fuming nitric acid gradually to a suspension of brown coal dust in carbon tetrachloride with vigorous stirring and then allowing the mixture to stand at a room temperature; nitrohumic acid No. 4: prepared by adding fuming nitric acid gradually to a suspension of lignite dust and brown coal dust in acetic acid with vigorous stirring and allowing the mixture to stand at a room temperature; nitrohumic acid No. 5: prepared by adding concentrated nitric acid to a suspension of brown coal dust in carbon tetrachloride and acetic acid and then allowing the mixture to stand at room temperature.

What is claimed is:

1. The process for the removal of hydrogen sulfide from gaseous or aqueous material through conversion of hydrogen sulfide into sulfur which comprises bringing said material into contact with nitrohumic acid or the sodium, potassium or ammonium salt thereof.

2. The process according to claim 1 wherein gaseous material is brought into contact with an aqueous solution of the sodium, potassium or ammonium salt of nitrohumic acid, said solution having a pH in the range of from 8 to 10.

3. The process according to claim 2 wherein the activity of said nitrohumic acid is regenerated through treatment with oxygen.

4. The process according to claim 3 wherein oxygen is passed through said solution after contact with the gaseous material.

5. The process according to claim 3 wherein oxygen is brought in contact with the solution continuously with said gaseous material.

* * * * *